UNITED STATES PATENT OFFICE.

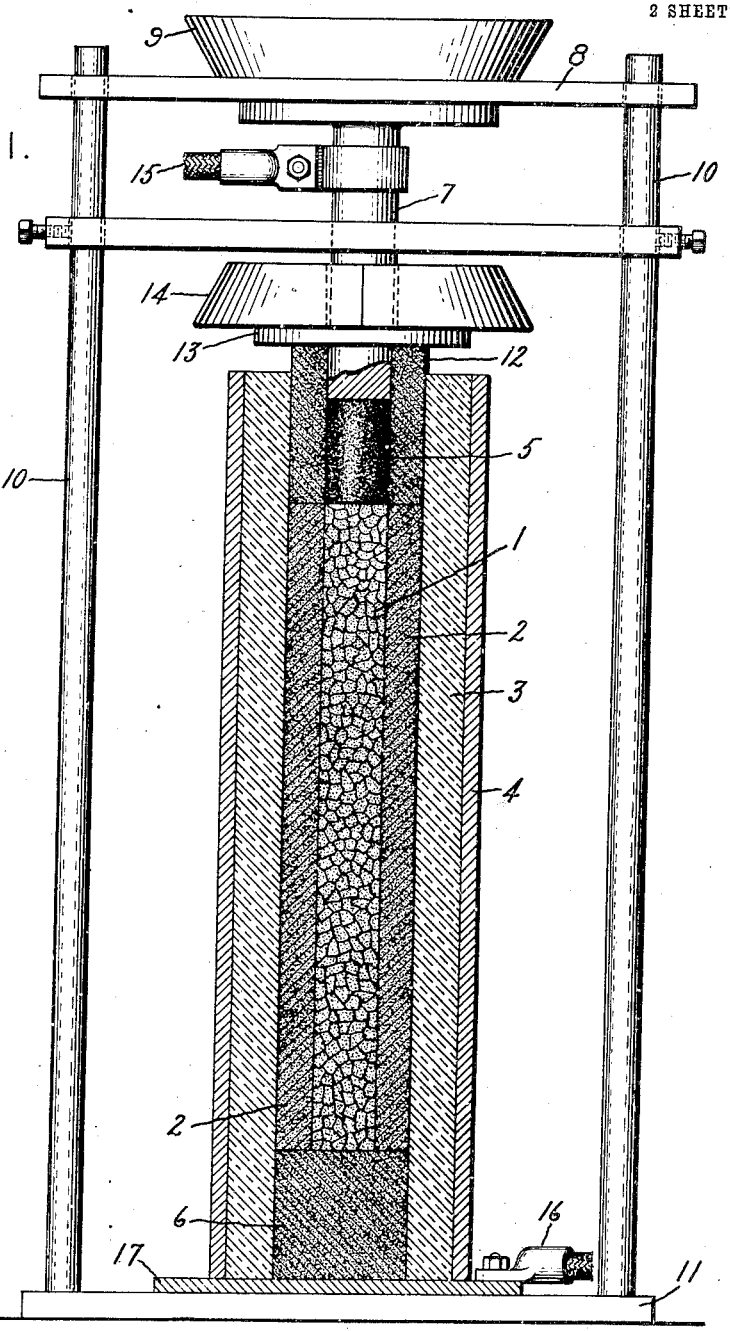

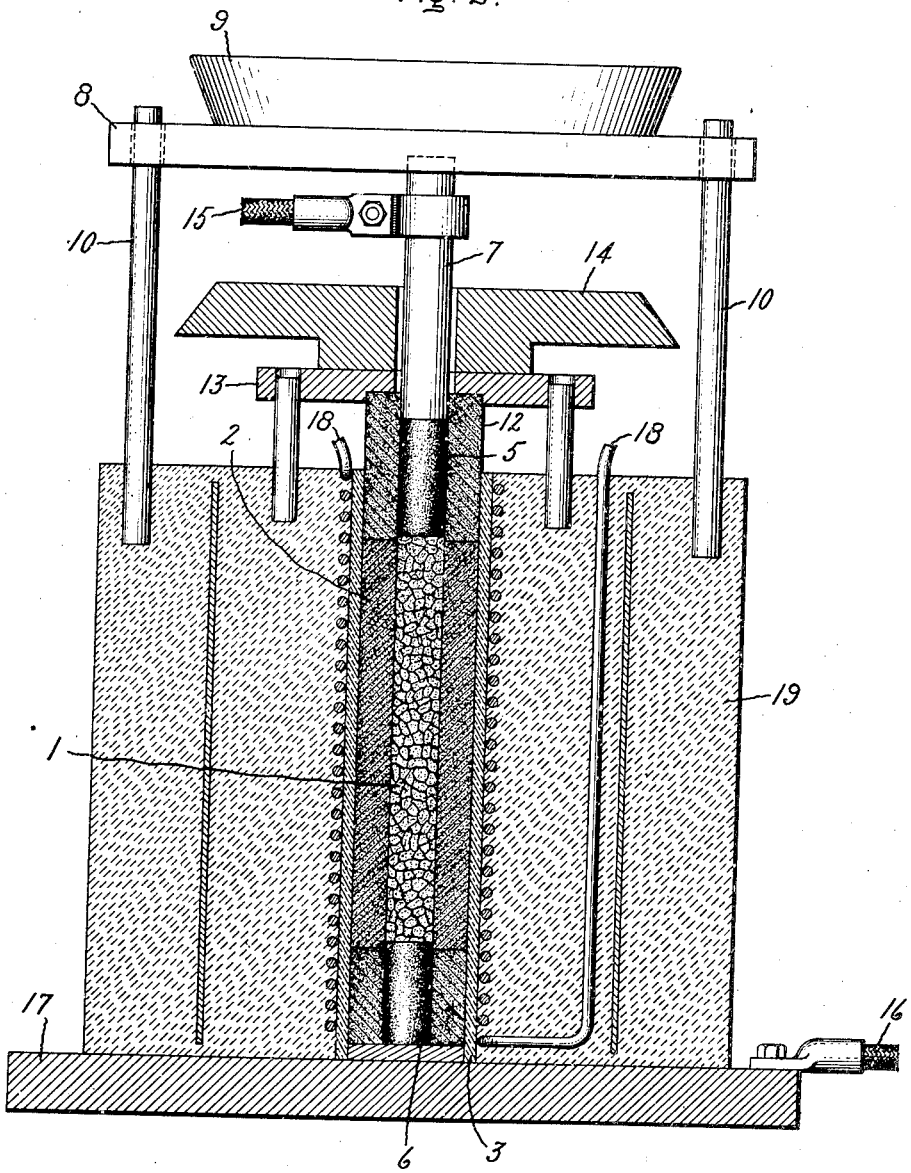

GEORGE WEINTRAUB AND HAROLD RUSH, OF LYNN, MASSACHUSETTS, ASSIGNORS TO GENERAL ELECTRIC COMPANY, A CORPORATION OF NEW YORK.

PROCESS AND APPARATUS FOR SINTERING REFRACTORY MATERIALS.

1,071,488. Specification of Letters Patent. Patented Aug. 26, 1913.

Application filed May 28, 1912. Serial No. 700,184.

*To all whom it may concern:*

Be it known that we, GEORGE WEINTRAUB and HAROLD RUSH, citizens of the United States, residing at Lynn, county of Essex, State of Massachusetts, have invented certain new and useful Improvements in Processes and Apparatus for Sintering Refractory Materials, of which the following is a specification.

The present invention relates to the consolidation of refractory materials to coherent homogeneous masses of definite shapes starting either from discrete particles, or from porous bodies consisting of the refractory materials loosely held together.

Two methods now in use for consolidating refractory substances are, first, melting substances in a suitable container in an electric furnace, and secondly, passing current through the material loosely consolidated by mechanical pressure or with a binder which can later be removed. In the case of boron, both of these methods fail entirely. Boron, because of its high melting point and great chemical activity at high temperatures cannot be cast while in a molten condition. Neither can it be sintered by the passage of current through a loosely compressed rod because of its enormous negative temperature resistance coefficient and high sintering temperature. The current concentrates in streaks and the rod melts in one place before the rest is sintered. A binder either introduces chemical impurities which cannot be removed or it volatilizes at a temperature lower than required to sinter boron.

In accordance with our present invention these difficulties are overcome by confining the material to be sintered within a given space surrounded by a material which has a high electrical insulating power at very high temperatures and is chemically inert toward the material which is to be sintered at the high temperature and then passing current through the material while pressure is exerted thereupon. In this manner even boron may be converted from a powder or from irregular masses into coherent, homogeneous rods, having substantially the density of fused boron.

Our invention also comprises a furnace for carrying out the above process, as will be more fully detailed in the following description taken in connection with the accompanying drawings.

Figure 1 is a longitudinal section of a sintering furnace; and Fig. 2 illustrates a modification.

Referring to Fig. 1, the material 1 to be consolidated, as elemental boron, boro-carbon, silico-carbon or other boron material has been indicated as consisting of irregular lumps or granular, but of course in some instances this material can be finely powdered. It is confined in a tube 2 consisting of a refractory material which is a good insulator for electricity and heat such as boron nitrid. Boron nitrid is preferably used as it is not only inert chemically toward most refractory materials and practically a non-conductor of electricity at very high temperatures, but also is so exceedingly refractory as not to soften even at the highest temperatures. The lining does not become pasty and hence does not stick to the heated material and impede the uniform shrinkage of the refractory material as it sinters together. The boron nitrid may be tamped in powdered form in a space of desired dimensions between the surrounding tube 3 of fused quartz or alundum and a core which is later removed. The tube 3 is surrounded by and supported by a metal tube 4. The terminals 5 and 6 consist of graphite or any other suitable refractory material. Pressure is exerted upon the electrode 5 by the rod 7 which is fitted into a platform or pressure plate 8 upon which weights 9 may be placed. The platform 8 is steadied and held in a level position by guide rods 10 supported by a wooden base 11. To protect it from deformation pressure is also applied upon the boron nitrid lining by means of ring 12 which may conveniently consist of graphite or other refractory material. Upon the ring 12 rests another plate 13 upon which a weight 14 may be placed. Current is supplied to the electrodes 5 and 6 by conductors 15 and 16, the terminals 16 being connected conveniently to a metallic base-plate 17.

Boron when cold has a high resistance, but if the passage of current is once initiated, the heat evolved rapidly reduces the resistance, as boron has a very high negative temperature resistance coefficient. In some cases, for example, current is first derived from a 15,000 volt transformer, the voltage being progressively decreased as the resistance falls until connections are finally shifted to a relatively low voltage source as a 500 volt or even 110 volt direct current generator. As the temperature of the boron particles increases to incipient fusion, the mass of boron shrinks and is compacted by the internal forces and the pressure upon the electrodes into a dense homogeneous cylinder. The sintering temperature can only be estimated but is around 2000° C. As before stated the pressure upon the boron nitrid lining and the fact that the lining does not soften even at a temperature of 3000 degrees enables the electrodes to approach each other in order to maintain a good contact both between the particles of material which are undergoing sintering and between the material and the electrodes. Otherwise internal arcing, local melting and opening of the circuit would result. The heat insulation afforded by the boron nitrid also equalizes the temperature of the boron and prevents irregular and localized fusion. Instead of weights upon the electrodes and lining, any other mechanical means for exerting pressure, such as a screw or hydraulic press may be used.

In the modified furnace, illustrated in Fig. 2, the silica tube 3 is surrounded by a heater wire 18 embedded in a surrounding mass of concrete 19. This heater is used in some cases to preheat the materials to be sintered before applying current. In other respects the furnace is similar to that already described. In this manner various refractory materials other than boron, such as refractory carbids, conducting nitrids, and metals such as tungsten, molybdenum, chromium, refractory alloys and the like may be converted into uniform dense masses of definite shape, having very nearly the same density as produced by actual fusion. Although refractory metals such as tungsten may be sintered without resorting to heat insulation, yet when masses of considerable cross-section are sintered great care must be exercised and the current increased slowly in order to avoid melting the inside of the rod before the outside is sufficiently sintered. This difficulty rapidly increases when the rods exceed about ¾ of an inch in cross-section. The heat insulation at high temperature afforded by our furnace enables very large homogeneous rods to be produced.

What we claim as new and desire to secure by Letters Patent of the United States, is:—

1. The process of compacting particles of a refractory material to form dense masses of definite shape which consists in confining said material within a given space by an inert substance of high electric and heat insulating properties and exerting continuously acting pressure upon said material while passing current therethrough.

2. The process of converting particles of boron material into coherent masses of high density and definite shape which consists in confining said boron by an inert material of high electrical insulating value and impressing upon said boron a potential great enough to break down its resistance and progressively increasing the wattage of said current while maintaining pressure upon the boron until the same sinters into a dense, homogeneous mass.

3. The process of consolidating particles of boron-containing material into homogeneous rods of high density which consists in confining said boron particles in a given space under conditions favorable to the retention of heat, passing through said boron a current sufficient to soften the same and exerting pressure to assist its sintering into a dense state.

4. The process of sintering discrete particles of boron into a solid homogeneous mass which consists in continuously applying pressure upon said boron particles while conducting therethrough an electric current until the material softens and sinters.

5. The combination of a mechanically strong container, a lining therefor consisting of an inert, refractory material of high electric insulating properties, means for continuously exerting pressure upon a material in said container, and means for conducting current through said material to soften the same.

6. The combination of a container, a lining therefor consisting of boron nitrid, means for exerting pressure upon materials placed into said container, means for independently exerting pressure upon said lining to maintain the same in position and counteract the pressure on the core, and electrical means for heating materials in said container to incipient fusion.

7. The combination of a metallic container, a lining therefor consisting of boron nitrid, means for exerting continuous pressure upon a material in said container, and electrical means for heating said material to a temperature permitting compression.

In witness whereof, we have hereunto set our hand this 25th day of May 1912.

GEORGE WEINTRAUB.
HAROLD RUSH.

Witnesses:
JOHN A. McMANUS, Jr.,
FRANK H. JOHNSON.